Nov. 16, 1937.　　　　　S. P. MILLER　　　　　2,099,131
THICK BUTT SHINGLE
Filed Feb. 27, 1934　　　　3 Sheets-Sheet 1
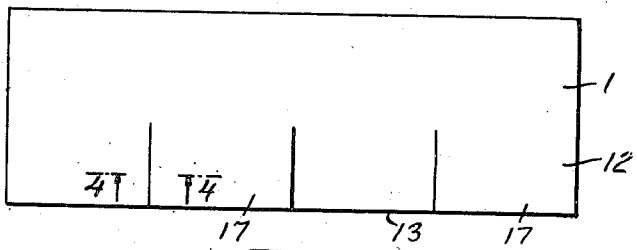
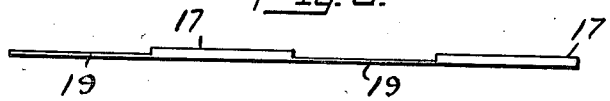
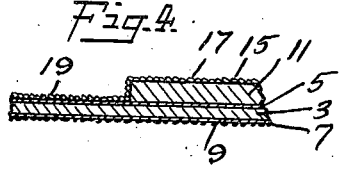
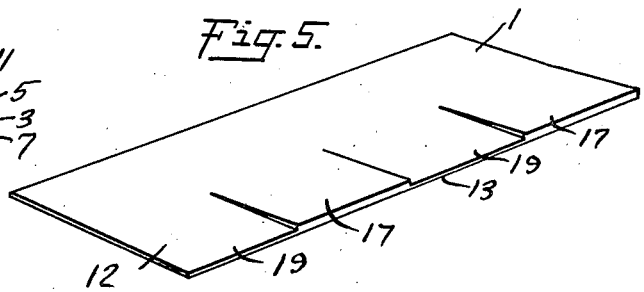
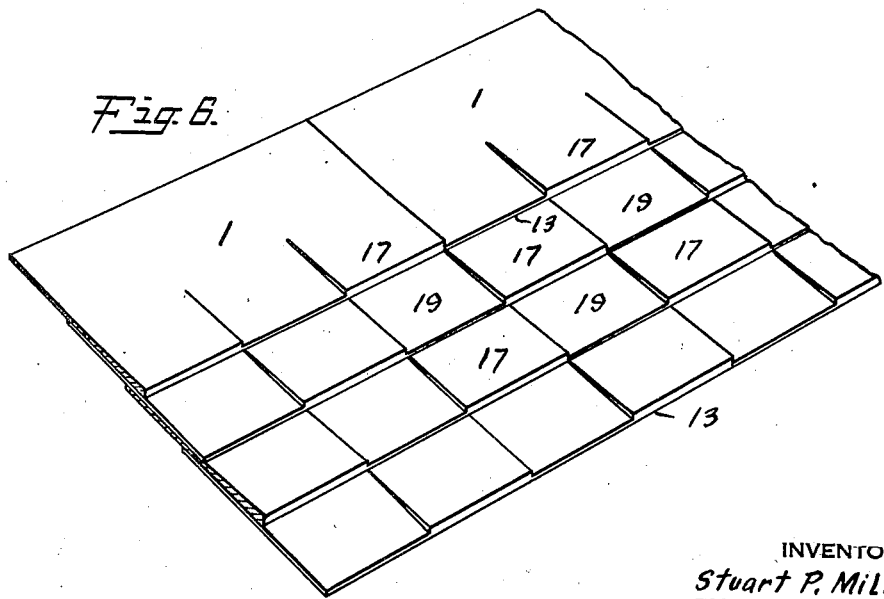
INVENTOR
Stuart P. Miller
BY
ATTORNEY Nov. 16, 1937.　　　　　S. P. MILLER　　　　　2,099,131
THICK BUTT SHINGLE
Filed Feb. 27, 1934　　　3 Sheets-Sheet 2
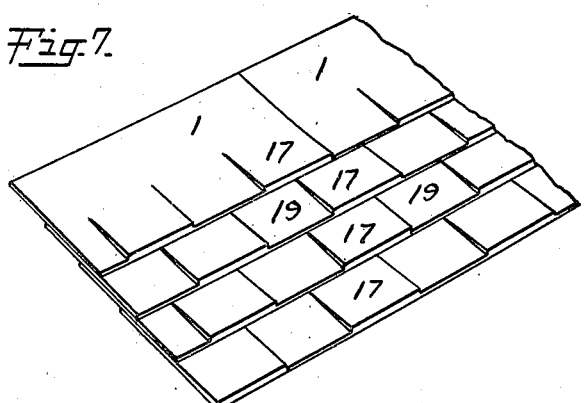
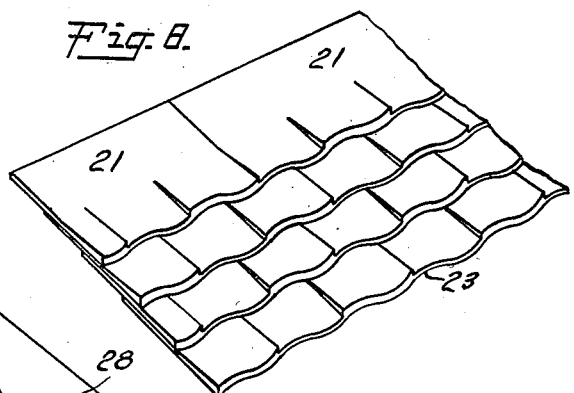
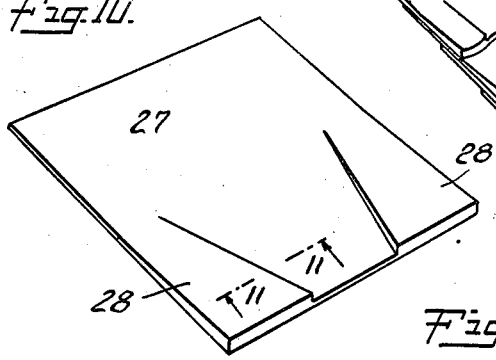
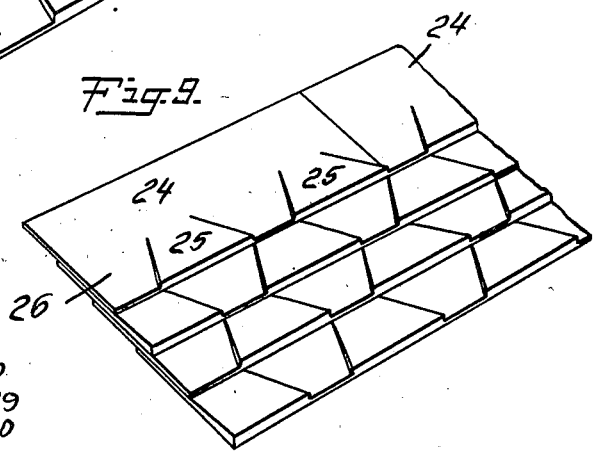
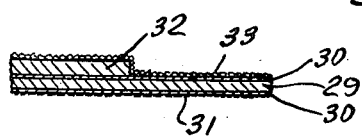
INVENTOR
Stuart P. Miller
BY
ATTORNEY Nov. 16, 1937.  S. P. MILLER  2,099,131
THICK BUTT SHINGLE
Filed Feb. 27, 1934   3 Sheets-Sheet 3
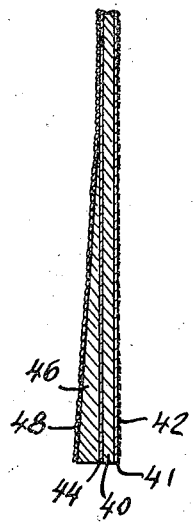
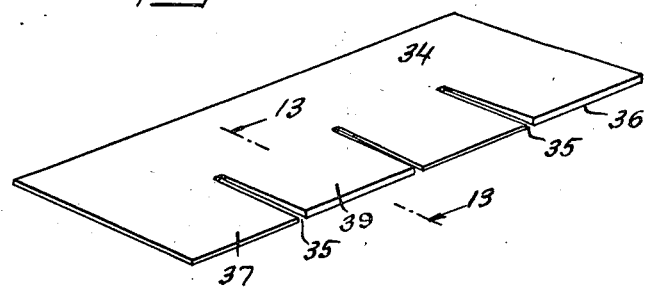
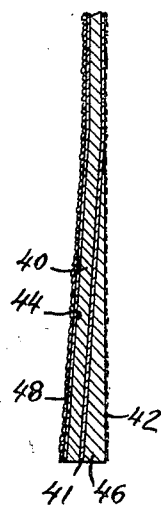
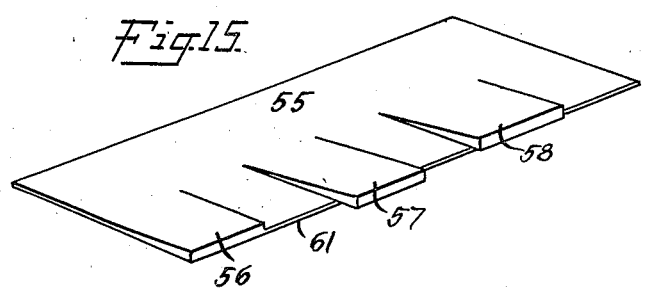
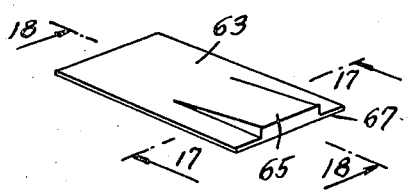
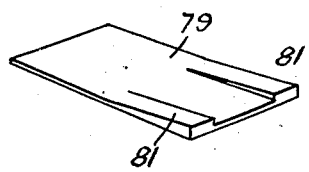
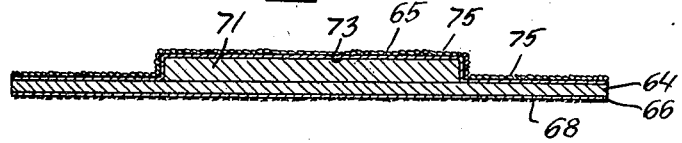
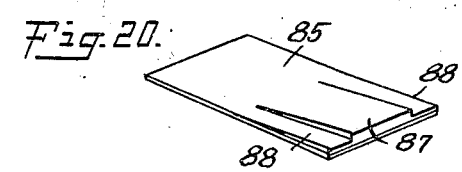
INVENTOR
Stuart P. Miller
BY
ATTORNEY Patented Nov. 16, 1937

2,099,131

UNITED STATES PATENT OFFICE 2,099,131

THICK BUTT SHINGLE

Stuart P. Miller, Scarsdale, N. Y., assignor to The Barrett Company, New York, N. Y., a corporation of New Jersey Application February 27, 1934, Serial No. 713,093

6 Claims. (Cl. 108—7)

This invention relates to roofing, and more particularly to thick butt shingles of the felt base type. The term "shingles" is used in a broad sense and is intended to include siding elements adapted to be applied to a wall as well as roofing units and shingle strips.

One object of this invention is to provide lightweight, durable roofing units or shingles of enhanced architectural value.

Other objects and advantages of this invention will appear from the following detailed description of the invention.

It has heretofore been common practice to manufacture prepared roofing by saturating a suitable absorbent fabric, such as roofing felt, with a liquid bituminous material, e. g., asphalt, coating both sides of the saturated fabric with a bituminous material, surfacing the bituminous coating on one side of the fabric with mineral grit, such as crushed slate, and applying mica, soapstone, or other anti-stick material to the coating on the other side of the fabric. This prepared roofing was then cut into individual shingles or into strip shingles. The strip shingles were customarily provided with slots along the forward edge thereof defining spaced tabs so that, when laid, the strips simulated a plurality of individual shingles.

One disadvantage of such shingles is that the exposed or tab edges have a tendency to warp and curl due to the action of wind, rain, and sun. Moreover, such shingles impart a rather monotonous, flat, unpleasant appearance to a roof or other surface to which they may be applied due to the fact that the exposed edges are relatively thin and of substantially uniform thickness.

It has been proposed to overcome these disadvantages by increasing the thickness of those portions of the shingles which are exposed to the weather when the shingles were laid. Such improved shingles, commonly called "thick butt" shingles, were generally made by applying an additional layer of bituminous coating material of uniform thickness over the grit surfacing material on the butt area of the ordinary single-coated and single-surfaced shingles, and then surfacing the overlay coating with a second layer of mineral grit.

In accordance with my invention, the desired butt thickness is obtained in a novel manner by the use of a light-weight bituminous mastic which is applied in a tapered layer or segment to only the butt portion of the shingle base. In making my shingles, I may coat both sides of an asphalt-saturated felt base with bituminous material, apply one or more tapered segments of bitumen-cork mastic to the butt portion of the coated base, and then apply mica flakes to the back and mineral granules to the exposed side of the coated base. The use of asphalt-cork mastic enables me to produce a thick butt construction in a very simple and efficient manner since there is no restriction on the thickness of the mastic which can be applied at one time. My units combine lightness with massive appearance—something entirely lacking in earlier types of thick butt units. The weight of my shingles is not materially greater than that of the ordinary flat single-coated and single-surfaced roofing elements so that there is substantially no increase in handling or shipping costs. Furthermore, the units may be applied to the ordinary roof structure without danger of overloading the supporting members. Aside from lightness, the bitumen-cork mastic layer is strong and resilient, and under working conditions, retains its shape far better than thick layers of unfilled asphalt.

For a better understanding of my invention reference should be made to the more detailed description thereof which is to follow and to the accompanying drawings, wherein are shown, by way of illustration, preferred embodiments of the invention and in which—

Fig. 1 is a plan view of a finished strip shingle;

Fig. 2 is a view of a transverse edge of the shingle of Fig. 1;

Fig. 3 is a view showing the forward or butt edge of the shingle of Fig. 1;

Fig. 4 is an enlarged section taken along the line 4—4 of Fig. 1 showing in detail the construction of the unit;

Fig. 5 is a perspective view of the shingle of Fig. 1;

Fig. 6 is a perspective view of a section of roof laid with the shingles of Fig. 1 and illustrates one method of application;

Fig. 7 is a perspective view of a section of roof laid with the shingles of Fig. 1 and illustrates an alternate method of application;

Fig. 8 is a perspective view of a section of roof laid with modified shingles having an irregular or wavy forward edge;

Fig. 9 is a perspective view of a section of roof laid with shingles having the tapered mastic segments applied to the base in a modified design;

Fig. 10 is a perspective view of an individual shingle which may be laid to form a roof having an appearance resembling that of Fig. 9;

Fig. 11 is an enlarged section taken along the line 11—11 of Fig. 10;

Fig. 12 is a perspective view of a strip shingle having tab-defining slots extending inwardly from the forward edge thereof;

Fig. 13 is an enlarged fragmentary section taken along the line 13—13 of Fig. 12, in which the mastic is applied to the exposed face of the element;

Fig. 14 is an enlarged section, similar to section 13—13, but in which the mastic is applied to the unexposed side of the element;

Fig. 15 is a perspective view of a strip shingle having mastic segments of varying length applied thereto;

Fig. 16 is a perspective view of an individual shingle having a tapered layer of mastic applied to the central portion of the base;

Fig. 17 is an enlarged section taken along the line 17—17 of Fig. 16;

Fig. 18 is an enlarged longitudinal section taken along the line 18—18 of Fig. 16;

Fig. 19 is a perspective view of an individual shingle having the mastic segments applied to the forward marginal portions thereof; and Fig. 20 is a perspective view of a shingle similar to that shown in Fig. 16, but having a tapered mastic layer of varying thickness applied to the entire butt portion thereof.

Referring to Figs. 1 to 5 of the drawings, reference numeral 1 indicates a strip shingle constructed in accordance with this invention. This unit comprises a substantially rectangular sheet or base 3 of bitumen-saturated roofing felt made of rag fiber, paper stock, or other absorbent fibrous material, with or without suitable fillers as well known in this art. A layer 5 (Fig. 4) of bituminous coating material, such as asphalt or other cementitious waterproofing substance suitable for coating roofing felt, substantially completely covers the top side of the base. The underside of the base 3 is covered with a sealback coating layer 7, the surface of which is rendered non-cementitious by the application thereto of a layer 9 of mica flakes, powdered soapstone, talc, or other material suitable for this purpose.

Spaced tapered layers or segments 11 of a light-weight mastic, such as a mixture of cork and asphalt, hereinbelow more fully described, cover spaced rectangular areas of the coating layer 5 on that portion of the strip adapted to be exposed to the weather, which portion is denoted by numeral 12. The mastic layer is thickest at the butt or forward edge 13 of the shingle and tapers uniformly to a point somewhat below the median line of the shingle. The shingle strip shown in Fig. 1 is provided on its butt or exposed portion with two raised areas of generally rectangular shape, in which the coating layer 5 is covered with mastic, and two spaced areas of substantially equal size to which no mastic is applied. The entire upper surface of the shingle is covered with a surfacing layer 15 of mineral granules such as crushed slate. There is thus formed a finished unit having the butt portion 12 provided with a series of relatively thick tapered portions 17 and intermediate relatively thin areas 19.

A mixture of asphalt and granulated cork is preferably employed to form the mastic portion 17. I may employ a mastic containing from 70% to 85% asphalt and from 15% to 30% granulated cork, the cork preferably being of a fineness to pass through an 8 mesh screen. A mastic having such a composition is very light and may be used in accordance with my invention to produce shingle-simulating roofing strips of the thick butt type without sacrificing lightness in the finished product. A mastic composed of 78% asphalt and 22% cork, for example, weighs only 5.8 pounds per gallon of mastic. If desired, a small amount of filler, such as mica flakes, may be added to the mastic. I may employ a mastic composed of about 70% asphalt, about 20% cork, and about 10% mica.

The asphalt-cork mastic results in the formation of a relatively light-weight, strong element, highly resistant to fracture. It is noted that the mastic layer is weather-resistant and retains its shape under all ordinary working conditions.

The strip shingle 1 shown in Fig. 1 may be laid on a roof or other surface with the shingles in each course placed in abutting relation and the shingles in adjacent courses placed in overlapping relation. Fig. 6 shows one method of application in which the units are staggered in such a manner that the thick butt portions 17 of each shingle are in vertical alignment with the thin areas 19 of adjacent overlying and underlying courses. As thus laid, the forward edge of the thickened portion 17 creates shadow lines which enhance the appearance of thickness of these exposed edges. This roof has a regular checkered appearance and resembles a roof formed by laying individual tapered thick butt shingles in wide-spaced relation. It should be noted that the tapered thick butt effect is obtained solely by the use of the mastic segments applied to the exposed portion of the base, no slots or cut-outs being employed to give the appearance of individual thick butt shingle units.

Fig. 7 is a perspective view of a portion of a roof in which the elements are laid somewhat differently from the arrangement of Fig. 6. In this instance, the shingles in one course are staggered with respect to those in an adjacent course; i. e., the thick butt segments 17 of each shingle occur midway between the thick and thin segments, denoted respectively by numerals 17 and 19, of shingles in the adjacent overlying and underlying courses. The top course indicates a reversal of the direction in which the shingles are staggered.

Fig. 8 shows a portion of a roof having a thatched appearance. Each shingle 21 used in forming this roof is similar in construction to shingle 1 described above with the exception that the forward or butt edge 23 is made irregular or wavy instead of straight.

Fig. 9 shows an attractive and pleasing roof which may be obtained by the use of shingles 24, each having tapered thick butt segments 25 of gradually increasing width formed on the exposed portion 26 thereof, as shown on the drawings.

A roof having an appearance similar to that of Fig. 9 may be obtained by employing individual roofing units 27, shown in Fig. 10, instead of shingle strips. Unit 27 has a generally triangular-shaped tapered section 28 formed on each marginal edge thereof. Such units may be built up in a manner similar to the strip shingle described above. As shown in Fig. 11, the unit may have a saturated felt base 29, covered on both sides with bituminous coating material 30, the coating on the under side of the unit being surfaced with mica flakes 31. Triangular-shaped tapered segments of mastic 32 overlie the coating material 30 along the forward marginal portions of the top of the unit. The entire top side of the unit is covered with a surfacing layer 33 of mineral grit. When such shingles are placed in a course in abutting relation, the abutting thick segments 28 on the non-homologous side edges of any two adjacent shingles will form a raised area similar in size and shape to the raised segment 17 on the shingle strips shown in Fig. 9.

Fig. 12 shows a strip shingle 34 similar to the shingle of Fig. 1 but having a series of slots or cut-outs 35 extending inwardly from the forward edge 36 and defining spaced tabs 37 and 39. Tabs 37 are equal in thickness to the body portion of the shingle while tabs 39 are thickened by the application of mastic thereto. The mastic may be applied to either the top or the under side of the tabs.

Fig. 13 is a section taken along the line 13—13 of Fig. 12 showing the application of the mastic to the top of the tab. In this figure, numeral 40 indicates the saturated felt base of the unit having a coating layer 41 surfaced with mica flakes 42 covering the under side thereof. The top side of the base is coated with a layer 44 of asphalt of uniform thickness, the coating on tabs 39 being covered with a tapered layer or segment 46 of asphalt-cork mastic. The upper face of the unit is substantially completely surfaced with mineral grit 48.

Fig. 14 is a section similar to that of Fig. 13 showing the tapered mastic segment applied to the under side of tab 39 instead of the top as shown in Fig. 13. As shown in this figure, the mastic segment 46 is preferably applied directly to the coating layer 41 on the under side of tabs 39 and the entire under side of the shingle then surfaced with mica flakes 42. When shingles having such construction are laid on a flat surface, the mastic will lie flat, causing an upward flexure of the tab as indicated in Fig. 14, thus resulting in substantially the same visual effect as though the mastic were applied to the top of the tab.

Instead of making each thick butt segment the same size, they may be made of different lengths and widths and may be irregularly spaced from one another. In Fig. 15, for example, I have shown a shingle 55 having tapered segments 56, 57 and 58 applied to the butt portion thereof. Segments 57 and 58 are longer than segment 56 and extend beyond the forward edge 61 of the unit. Segment 58 is considerably wider than either of the other two segments. When laid in overlapping courses, such shingles form a roof having an irregular and pleasing appearance. Instead of obtaining differences in length by having the edges of segments 56, 57, and 58 protrude beyond the forward edge 61 of the base, such differences in length may be obtained by varying the distances to which the individual segments extend from the thin portion of the segments to the forward thick edge thereof, the latter edges being thus spaced different distances from the forward edge of the felt base, or the segments may all be flush with the forward edge of the base sheet and extend back different distances, providing segments of different lengths.

Fig. 16 shows an individual shingle 63 having a thick butt tapered segment 65 of generally rectangular shape applied to the forward central portion of the unit, the thick edge of the segment being in line with the forward edge 67 of the base. With reference to Figs. 17 and 18, it will be noted that shingle 63 comprises a bitumen-saturated felt base 64 having a seal-back coating 66 of bituminous waterproofing composition, such as asphalt, rendered non-cementitious by the application thereto of an overlying layer 68 of suitable material, such as flake mica. The top side of base 64 on the central butt portion of the unit is covered with a tapered segment 71 of cement-cork mastic. The entire top face of the unit is covered with an asphalt layer 73 of substantially uniform thickness and a surfacing layer 75 of protective material, such as mineral grit.

As shown in Figs. 17 and 18, the width of thick butt segment 65 is equal to approximately one-half the total width of the unit 63. Such shingles may be laid in abutting relation and overlapping courses to produce roofs resembling those formed by the application of the strip shingles of Fig. 1. The relative width of the thick butt segment 65 may be varied to produce shingles which, when laid, form roofs having a greater or lesser spacing between adjacent thick butt segments.

Fig. 19 shows in perspective a unit 79 of generally uniform thickness having a tapered rectangular segment 81 applied to each forward marginal portion thereof. This shingle can be laid with similar shingles in abutting relation to form a roof having an appearance resembling that formed by the application of shingles 63 of Fig. 16.

An entirely different type of broad shadow effect can be obtained by applying mastic in alternately thicker and thinner segments to the entire exposed portion of a shingle unit or strip shingle rather than to selected areas thereof. Fig. 20, for example, shows such a shingle unit 85 having a relatively thick tapered mastic segment 87 applied to the central exposed portion thereof and relatively thin tapered segments 88 applied to the exposed marginal portions thereof.

In manufacturing the elements of this invention, the thick butt mastic segments employed in forming the shingle-simulating tabs may be formed on the coated shingle base by pressing or rolling the mastic to shape; or the tapered segments may be preformed, and while in adhesive condition, placed in position on the freshly coated base and permitted to set in such position. The segments may be applied over the surfacing of a coated and surfaced base and the mastic segments then surfaced with additional grit.

It will be noted that the shingles of this invention are simple in construction and easy to manufacture. The shingle-simulating areas of tapered thickness may be made in any design, configuration, or size so that when the units are laid, pleasing and attractive roofs are produced. The units combine massive appearance with lightness in weight—something which has long been desired in the roofing industry. Because of the light weight of the shingles, it is unnecessary to provide heavy roof decks or foundations for the shingles, that is, rafters and roof boards. Furthermore, the thick tapered asphalt-cork mastic layer does not deform or slip as has heretofore been the case with thick butt shingles having a thick layer of asphalt thereon.

In the preferred modifications illustrated in the drawings, the tapered mastic layer extends from the exposed forward edge of the element to the top of the exposed portion and not to the top edge of the element. Hence, an economy in the amount of mastic for producing the shingle is effected and this without sacrifice to the thickness of the exposed butt.

In connection with the foregoing description and illustrations of the preferred shingles of this invention, it should be understood that these are merely for the purpose of clarifying an understanding thereof. Various changes and modifications may be made within the scope of this invention. For example, although I have disclosed elements having only one row of shingle-simulating tapered segments on the exposed portion thereof, two or more rows of such segments may be formed, if desired. If desired, the entire strip may be made of bitumen-cork mastic with or without a suitable fabric backing. If no backing is employed, a relatively hard bitumen should preferably be used, the bitumen being liquefied by heat, mixed with cork, and the resultant mastic molded while warm so that it will set and harden in the desired shape upon cooling.

Since certain other changes in the constructions set forth may be made without departing from the scope of this invention, it is intended that all matter contained in the above description or shown in the accompanying drawings shall be interpreted as illustrative and not in a limiting sense.

I claim:

1. A light-weight shingle strip having shingle-simulating tapered sections applied thereto, comprising a bitumen-saturated felt base, a coating of bitumen of substantially uniform thickness on each side thereof, tapered segments of bitumen-cork mastic applied at spaced intervals over the coating on the exposed portion of the shingle, each segment imparting the appearance of an undivided shingle and contiguous segments being spaced apart a distance equal to at least the width of a segment, the thick edges of the tapered segments being in line with the forward edge of the strip, a surfacing of mineral granules substantially completely covering the top side of the strip, and a surfacing of mica flakes covering the under side of the strip.

2. A light-weight shingle strip comprising a bitumen-saturated felt base having spaced slots extending inward from the forward edge thereof defining shingle-simulating tabs, said base having a coating of bitumen of substantially uniform thickness on each side thereof, tapered segments of asphalt-cork mastic covering the coating on the under side of alternate tabs, the tapered mastic segments being thickest at the butt edge of the tabs, a surfacing of mineral granules covering the top side of the strip, and a surfacing of mica dust on the under side of the strip.

3. A light-weight shingle strip having shingle-simulating tapered sections applied thereto, comprising a bitumen-saturated base, a coating of bitumen of substantially uniform thickness on each side thereof, a plurality of rows of tapered segments of bitumen-cork mastic containing about from 15% to 30% of cork applied over the coating on the exposed portion only of the shingle, adjacent segments in each row being spaced from each other a distance approximately equal to the width of a segment and imparting the appearance of individual thick-butt shingles, a surfacing of grit covering the top side of the strip, and a surfacing of non-cementitious material covering the under side of the strip.

4. A thick butt strip shingle comprising a felt base and bituminous mastic material applied thereto in relatively thick layers over separated areas of said base adapted to be exposed to simulate shingles having relatively thick butt ends, said areas alternating with other areas having thereon a relatively thin layer of said mastic, said latter areas being relatively wide to simulate shingles of less thickness than said first mentioned areas.

5. A light weight thickened butt shingle comprising a flexible fibrous base having a coating of light weight bituminous mastic material thereon, said mastic coating imparting a thick butt appearance to a portion of the exposed butt edge of said shingle, another portion of said exposed butt edge being relatively thin, both said thick and thin butt edge portions being relatively wide to simulate the butt edges of relatively thick and relatively thin shingles respectively as distinguished from spaces between shingles.

6. A roof covering comprising a plurality of waterproof felt base shingle elements laid in overlapping courses with the butt portions of the shingles of each course overlying upper portions of shingles of a previously laid course, said shingle elements having flat lower surfaces so that they lie flat on the roof and on the underlying elements, the shingle elements having coating layers of light weight bituminous mastic thereon, said mastic coating layers forming thick butt edge portions alternating with thin butt edge portions, both said thick butt edge portions and said thin butt edge portions being of a width to simulate the butt ends of individual shingles as distinguished from the spaces between adjacent shingles so that said roof has the appearance of being constituted of alternate thick and thin shingles.

STUART P. MILLER.